United States Patent [19]

Rougeot

[11] 4,119,852
[45] Oct. 10, 1978

[54] SOLID DETECTOR FOR IONIZING RADIATION

[75] Inventor: Henri Rougeot, Paris, France

[73] Assignee: Thomson-CSF, Paris, France

[21] Appl. No.: 762,287

[22] Filed: Jan. 25, 1977

[30] Foreign Application Priority Data

Jan. 30, 1976 [FR] France .............................. 76 02586

[51] Int. Cl.[2] .............................................. G01T 1/24
[52] U.S. Cl. .............................. 250/370; 250/213 VT; 250/330; 313/103 CM
[58] Field of Search ................ 250/213 VT, 330, 332, 250/333, 370; 357/29; 313/103 CM, 105 CM

[56] References Cited

U.S. PATENT DOCUMENTS

| 3,387,137 | 6/1968 | Adams .......................... 250/213 VT |
| 3,394,261 | 7/1968 | Manley et al. ................ 250/213 VT |
| 3,424,909 | 1/1969 | Rougeot .................... 250/213 VT X |
| 3,887,810 | 6/1975 | Skaggs ............................. 250/370 X |

Primary Examiner—Archie R. Borchelt
Attorney, Agent, or Firm—Roland Plottel

[57] ABSTRACT

A solid detector for detecting the presence of ionizing radiation in the noise of the detector crystal. For this purpose, the device provides for the generation, at the moment of each of pulses of the ionizing radiation, of signals which open a gate towards a level selector. The device comprises a semiconductor, provided with microchannels where electrons are multiplied by means of secondary emission, and a collector of the electrons generated in the microchannels. The signals which open the gate are generated by the secondary electrons issuing from the microchannels and picked up by the collector.

5 Claims, 6 Drawing Figures

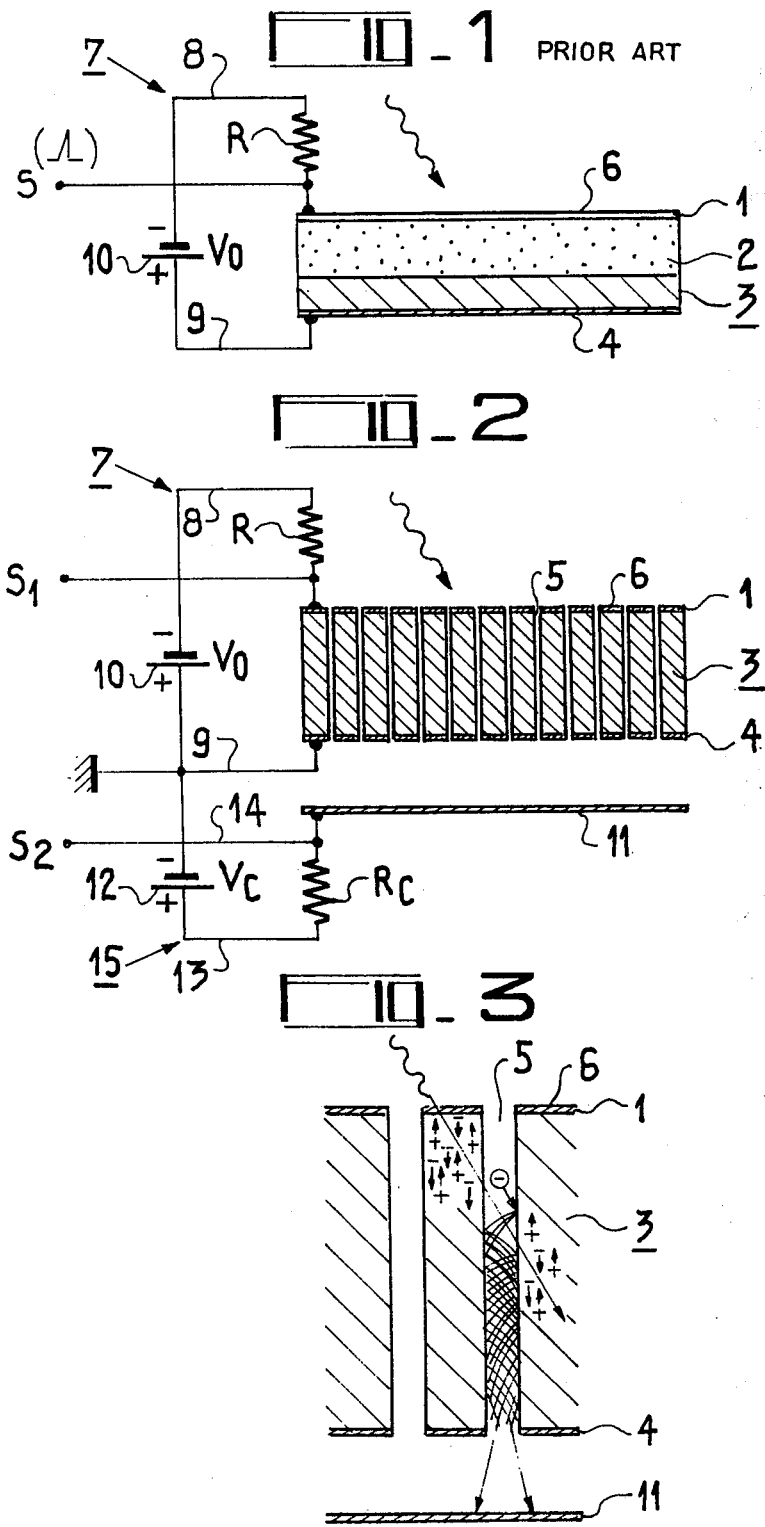

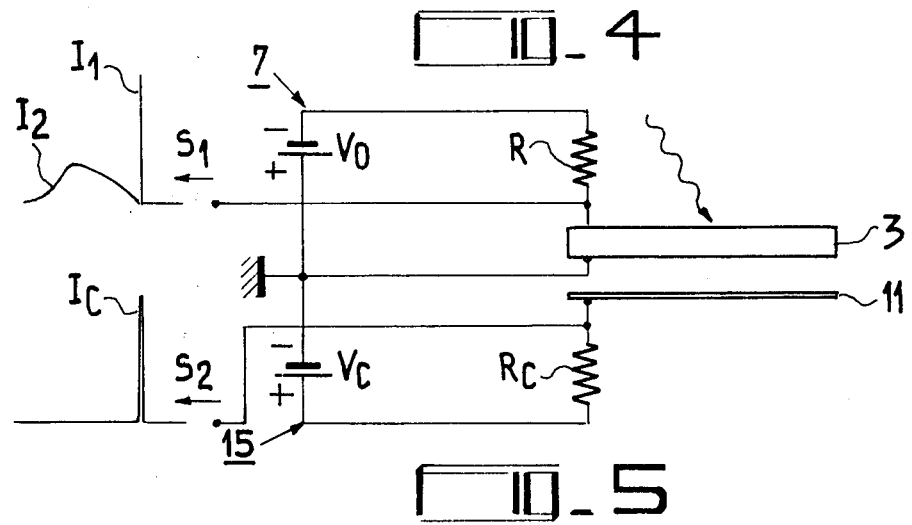
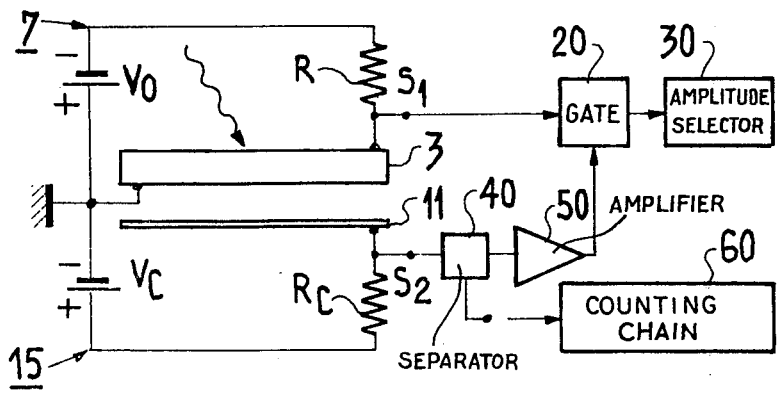
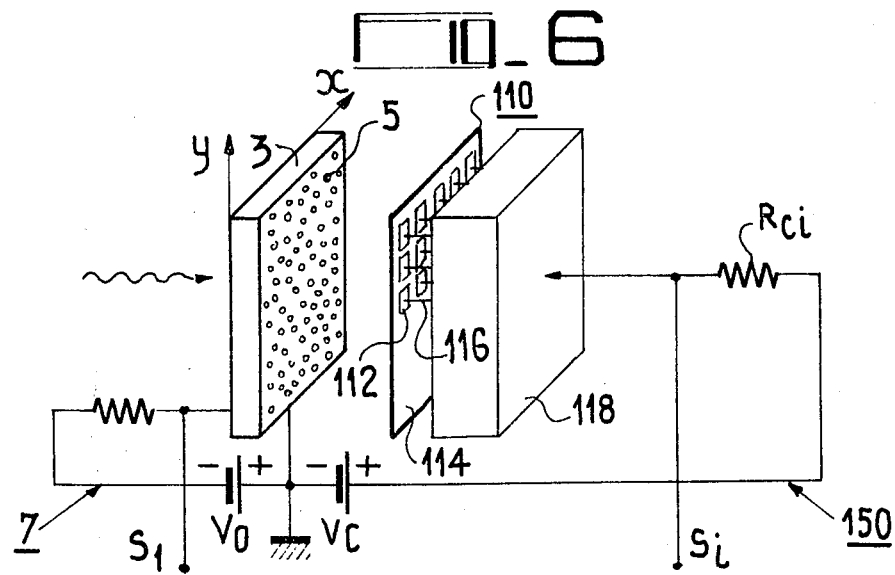

SOLID DETECTOR FOR IONIZING RADIATION

This invention relates to a new type of solid detector for ionizing radiation which combines the advantages of semiconductor counters with those of microchannel electron multipliers.

A conventional semi-conductor detector, or counter, is formed by a crystallised semi-conductive or semi-insulating material in which an electrical field is created through two electrodes to the terminals of which a voltage is applied. When an ionizing particle enters this field zone, the molecules forming the semi-conductor are ionizied, thus liberating charges which are collected by the electrodes. The number of charges collected depends upon the effectiveness of the semi-conductor in collecting, upon the ionization energy and upon the energy transported or given off by the ionizing particle.

The quantity of charges collected is proportional to the energy released by the incident ionizing radiation. In order to increase that quantity of energy, it is thus necessary either to have a significant active volume in the semi-conductive solid or to be able to use a material which is highly absorbent to the considered incident radiation, X, $\alpha$, $\beta$ or $\gamma$ radiation, i.e. a heavy material or a material of high atomic weight.

According to the prior art, various solutions have been adopted in order to fulfill the first condition, i.e. to have a significant active volume in the semi-conductive solid. Briefly, these solutions are:

a *pn* junction or surface barrier in high-purity semi-conductors;

*p i n* structures in compensated semi-conductor materials, i.e. semi-conductor materials restored after doping by charges of a given sign to a state approaching the intrinsic state ($i$), i.e. to a low density of free carriers, by the diffusion of charges of opposite sign;

structures of monocrystalline semi-insulating material, brought to the intrinsic state, consisting of a plate of such a material provided on its surfaces with electrodes between which a bias is maintained.

The second condition, i.e. absorption of the ionizing radiation to a high degree by a heavy semi-conductor, is fulfilled by the choice of the material which is virtually limited to silicon and to germanium for the first three of the above-mentioned structures, whilst heavier materials such as gallium arsenide, cadmium telluride, mercury iodide, to name only the principal representatives, can be used with the fourth type of structure mentioned above. Germanium can also be used in this latter case.

Concerning the electron multipliers, it is recalled that they consist of an insulating body formed with channels of small diameter which are coated over their inner surface with a conductive layer of minimal thickness and high resistance of a material having the property of secondary electronic emission with a coefficient greater than 1. In operation, a potential difference is applied between the two ends of the channels. Under these conditions, a primary electron entering one of the channels at any angle gives rise to a succession of secondary electron emissions by the resistive wall of the channel. There is thus collected at the output end of the channel a number of secondary electrons much greater than the number of electrons which entered at the opposite end. One particular structure of these multipliers formed with microchannels in a block of semi-conductor material is described in Applicants' French Patent No. 1,465,381 equivalent to U.S. Pat. No. 3,424,909.

The ionizing radiation detector according to the invention combines the two elements described above, namely a semi-conductive detector crystal and a microchannel electron multiplier, in one and the same structure.

According to the invention, there is provided a solid detector for ionizing radiations comprising:

a semi-conductor body comprising electron multiplying microchannels, wherein a primary electron produces a plurality of secondary electrons;

a semi-conductor body biassing circuit, which is associated with said semi-conductor body and through which a signal, called semi-conductor signal, passes with each ionizing radiation;

a collector;

means for biassing said collector in such a way that said collector picks up said secondary electrons produced by said radiations by means of primary electrons, thus generating a collector signal;

a gate which is controlled by said collector signal;

a level selector, which is controlled by said gate in order to receive said semi-conductor signal when said collector signal allows the latter signal to pass.

For a better understanding of the invention and to show how it may be carried into effect, reference will be made to the following description in conjunction with the accompanying drawings, wherein:

FIG. 1 is a diagrammatic section through a semi-conductor detector of the prior art.

FIG. 2 is a diagrammatic section through one example of embodiment of the ionizing radiation detector according to the invention.

FIG. 3 is a view on a larger scale of part of the preceding Figure.

FIG. 4 is a view of the detector shown in FIG. 2 which is intended to explain the operation of the detector according to the invention and which shows the form of the signals collected.

FIG. 5 is a view of the same detector with the circuits in which these signals are processed.

FIG. 6 is a diagrammatic perspective view of another variant of the detector according to the invention.

FIG. 1 shows a *pn* type semi-conductor detector of the prior art, comprising a *p*-type diffusion 1 in a plate 3 of *n*-type crystalline semi-conductor material. The reference 10 denotes a d.c. voltage source of which the terminals are connected by connections 8 and 9, as shown by the FIG., to a conductive film 6 covering the diffusion zone 1 and to a contact plate 4 applied to the opposite surface of the plate 3. On the scale of the drawing, the film 6 and the zone 1 are merged in one another. The source 10 forms, with a resistor R connected between the source 10 and the film 6, the biassing circuit of the semi-conductor 3.

In operation, a space charge zone 2 marked by dots, in which an electrical field prevails, is created in the plate 3 under the effect of the voltage $V_o$ supplied by the source 10. The charges produced by the ionization of the semi-conductor body 3 by the incident ionizing radiation (represented by the wavy arrow) travel through this field. In the biassing circuit 7 of the semi-conductor 3, these charges produce a voltage pulse *s* which is collected at the terminals of the resistor R, corresponding to the incident ionizing radiation.

FIG. 2 shows a diagrammatic section through one embodiment of the ionizing radiation detector according to the invention given by way of example. This detector, in a monocrystalline semi-conductive plate, combines the properties of the preceding solid radiation detector with the properties of the electronic multiplication process in a system of microchannels formed in this plate.

FIG. 3, which shows part of FIG. 2 on a larger scale, illustrates the movement of the positive and negative charges in the semi-conductor 3 and the multiplication of the electrons by successive impacts on the walls (arrows) of the micro-channel when one or more electron(s) is/are injected into this channel. One such electron is represented by the ringed sign − at the top of the microchannel (5). The non-ringed signs + and − in the Fig. represent the free positive and negative charges in the semi-conductor 3.

The electrons resulting from this multiplication are collected by a collector 11 (see also FIG. 2) which is brought by the source 12 and the connections 13 and 14 to a potential $V_c$ relative to the end of the channels 5 and to the electrode 4. They are detected through a load resistor $R_c$ at the terminals of which a signal $s_2$ is collected. The resistor $R_c$ and the source $V_c$ constitute the circuit 15 of the collector 11.

The charges which have remained free in the crystal 3 are detected and give rise to another signal ($s_1$) which is extracted at the terminals of the resistor R in the biassing circuit 7 of this semi-conductive crystal 3.

FIG. 4 shows the pulses obtained in each of the two circuits which have just been mentioned, the biassing circuit 7 and the circuit 15 of the collector 11, into which the resistors R and $R_c$ are inserted and the signal $s_1$ and $s_2$, respectively, collected.

In the circuit 7, the signal $s_1$ which is refered to as the semi-conductor signal, is formed by two pulses: $I_1$ and $I_2$. The first pulse is a narrow pulse of high amplitude, denoted by the reference $I_1$ in the Fig., in relation to a horizontal time axis. The pulse $I_1$ is due to the flow of the charges induced in the semi-conductor 3 by the emission of the secondary electrons in the microchannel 5. This pulse $I_1$ is followed in the same circuit 7 by a second pulse $I_2$, which is more spread out as a function of time and which has a lower peak amplitude. The pulse $I_2$ is due to the collection of the charges created in the semi-conductor 3 by the incident ionising radiation along its path in the semi-conductor. This second pulse $I_2$ is the useful pulse to be detected. Its energy is equal to the surface area which it delimits above the horizontal axis. This pulse is that which is collected in the semi-conductor radiation detectors of the priort art (signal s in FIG. 1). But, in these prior art devices, that useful pulse is in danger of being embedded in the noise of the rest current of the semi-conductor and of merging with it.

In the circuit 15, the signal $s_2$ which is refered to as the collector signal, consists of a pulse $I_c$ with the same shape as the pulse $I_1$. This pulse $I_c$ is due to the collection by the collector 11 of the secondary electrons issuing from the microchannels 5.

The pulse $I_c$ is used in the detectors according to the invention for extracting the preceding pulse $I_2$ from the noise of the device, under the conditions which will be discussed hereinafter with reference to FIG. 5, in which the same elements are denoted by the same references as in FIG. 4.

In addition to these elements, the FIG. 5 shows a gate 20 which receives the signal $s_1$, i.e. the two preceding pulses $I_1$ and $I_2$, and which is controlled by the collector signal $s_2$, i.e. the pulse $I_c$.

When the pulse $I_c$, perfectly detectable by virtue of the multiplication undergone in the microchannels 5, is received by the collector 11 substantially at the moment when the pulse $I_2$ to be detected begins, the gate 20 opens the way for the signal $s_1$ to pass to an amplitude, or level, selector 30 which is provided for spectrometry of the particles. By contrast, as long as no pulse $I_c$ is detected in the circuit 15, this route remains closed to the signal $s_1$. Therefore, the signal $s_1$ only reaches the selector 30 when a pulse $I_c$ is produced which, according to the foregoing, always accompanies a pulse $I_2$ due to the incident ionizing radiation. Accordingly, this latter pulse ($I_2$) is identified in the detector according to the invention at the moment when it is produced and, as a result, can no longer be mistaken for the noise of the biassing circuit 7 of the semi-conductor. Obviously this does not mean that it cannot continue to be accompanied by noise.

The device shown in FIG. 5 further comprises an amplifier 50, which is fed by the collector 11, by means of a separator 40 which itself feed a counting chain 60 for the pulses created by the ionizing radiations. In this manner, the number of pulses can be counted by means of the collector signal ($s_2$) in the chain 60 by virtues of the separator 40.

It will be noted that the collector signal $I_c$ is not itself representative of the energy level of the ionizing radiation, because the circuit of the collector 15 always operates at saturation level. The signal $s_2$ is the same irrespective of the number of electrons at the entrance of the microchannel 5 (FIG. 3). That signal reaches its maximum value even for a single electron injected at the entrance of the microchannel 5. The only function of this signal $I_c$ is to trigger the circuit for measuring the energy levels through the amplitude selector 30.

By allowing the ionization pulse to be separated from the noise of the biassing circuit of the semi-conductor, the detector herein described enables radiations to be detected at much lower energy levels than the prior art and, hence, provide for finer spectrometry. This is one advantage of the detectors according to the invention.

It was mentioned earlier on that two pulses $I_1$ and $I_2$, of which only the pulse $I_2$ is useful, are present in the biassing circuit 7 of the semiconductor 3. It was believed that these two pulses arrived in succession. Actualy, the ionizied particles created in the semi-conductor travel much more slowly in the semi-conductor than the electrons in the microchannel multiplier. Accordingly, the pulse $I_2$ follows the pulse $I_1$.

In addition, by selecting the time constant of the biassing circuit 7, it is possible in the detectors according to the invention to ensure that the $I_2$ follows $I_1$ immediately, i.e. with hardly any time interval inbetween, as shown in FIG. 4.

If there is any danger of interference from the pulse $I_1$, it is possible for that pulse to be eliminated by an additional arrangement: the collector signal $I_c$ is substracted from the signal $s_1$ so that it only remains the useful pulse $I_2$ in the signal $S_1$.

Finally, in a variant of the invention which is shown in FIG. 6, which is a diagrammatic perspective global view, the collector 11 of the preceding FIGS. which bears the reference 110 in this FIG. 6, is formed by a mosaic of conductor studs 112 inserted into an insulating support 114 to face the microchannels 5. Each stud 112 is provided with a connection 116 connected to an element 118 allowing the studs to be indexed in the directions $x$ and $y$.

The signal $s_i$ generated by each of the studs 112 is read in a resistor $Rci$ of a circuit 150 associated with each connection 116. As the detector hereinbefore described, this device indicates the energy level of the ionizing radiation resulting from the signal $s_1$ of the biassing circuit 7 of the semi-conductor 3. But, in addition, this detector indicates through this indexing, the corresponding point of impact of the ionizing radiation on the crystal with a resolution defined by the structure of the mosaic.

The applications of the detectors according to the invention are the same as those of conventional detectors, in particular spectrography of the energy of X, $\alpha$, $\beta$ and $\gamma$ radiation.

The detectors according to the invention are produced by conventional techniques and with the materials normally used in this field. Reference has been made to a certain number thereof which were either single bodies or binary combinations. More generally, binary or ternary combinations of the elements of Groups III and V or Groups II and VI of the Periodic System may be used as the constituent material of the body 3 of the detectors according to the invention, cadmium selenide and the phosphides of indium or gallium being particularly suitable.

Of course, the invention is not limited to the embodiments described and shown, which were given solely by way of example.

What is claimed, is:

1. A solid detector for ionizing radiations comprising:
   a semi-conductor body comprising electron multiplying microchannels, wherein a primary electron produces a plurality of secondary electrons;
   a semi-conductor body biassing circuit, which is associated with said semi-conductor body and through which a signal called semi-conductor signal passes with each ionizing radiation;
   a collector;
   means for biassing said collector in such a way that said collector picks up said secondary electrons produced by said radiations by means of primary electrons, thus generating a collector signal;
   a gate which is controlled by said collector signal;
   a level selector, which is controlled by said gate in order to receive said semi-conductor signal when said collector signal allows the latter signal to pass.

2. A detector as claimed in claim 1, wherein said semi-conductor signal comprises two pulses, a first pulse and a second pulse which is the pulse to be detected, and which is coincident with said collector signal, the time constant of said semi-conductor biassing circuit being selected in such a way that said second pulse follows said first pulse immediately, i.e. without any time interval inbetween.

3. A detector as claimed in claim 1, wherein said semi-conductor body is a plate of an $n$-type monocrystal having two surfaces, and wherein said semi-conductor biassing circuit comprises a first electrode applied to a $p$-type diffusion covering the first of said surfaces of said plate, a second electrode applied to the second of said surfaces and a voltage source in series with a resistor connected between said first and second electrodes, the negative terminal of said source being connected to said first electrode and the positive terminal of said source to said second electrode.

4. A detector as claimed in claim 1, wherein said collector consists of a mosaic of conductor studs which are insulated from one another, each of said stud being provided with a connection, and wherein means for indexing said studs in the directions $x$ and $y$ are provided between said connections and said gate.

5. A detector as claimed in claim 3, wherein said semi-conductor body consists of a monocrystal of one of the chemical substances from the group comprising silicon, germanium, gallium arsenide, cadmium tereuride telluride, cadmium selenide, indium phosphide, gallium phosphide and mercury iodide.

* * * * *